(12) United States Patent
Borugian

(10) Patent No.: US 6,722,728 B2
(45) Date of Patent: Apr. 20, 2004

(54) HIGHWAY VEHICLE PLATFORM

(75) Inventor: Dennis A. Borugian, High Point, NC (US)

(73) Assignee: Volvo Trucks North America, Inc., Greensboro, NC (US)

(*) Notice: Subject to any disclaimer, the term of this patent is extended or adjusted under 35 U.S.C. 154(b) by 0 days.

(21) Appl. No.: 10/139,563

(22) Filed: May 6, 2002

(65) Prior Publication Data

US 2003/0205914 A1 Nov. 6, 2003

(51) Int. Cl.⁷ .............................................. B60R 27/00
(52) U.S. Cl. ...................... 296/183; 296/26.04; 411/500
(58) Field of Search ............. 296/26.04, 181, 296/182, 183, 187, 197; 411/81, 388, 396, 500, 548, 923

(56) References Cited

U.S. PATENT DOCUMENTS

| | | | |
|---|---|---|---|
| 2,850,934 A | * 9/1958 | Sehn | ......................... 411/388 |
| 3,620,027 A | 11/1971 | Nordell | |
| 4,007,567 A | * 2/1977 | Mooney et al. | ............. 296/181 |
| 4,078,515 A | 3/1978 | Svirklys | |
| 5,048,448 A | 9/1991 | Yoder | |
| 5,286,049 A | 2/1994 | Khan | |
| 5,351,990 A | * 10/1994 | Thomas | ...................... 296/182 |
| 5,449,191 A | 9/1995 | Cattau | |
| 5,593,167 A | 1/1997 | Barnhardt et al. | |
| 5,617,689 A | 4/1997 | Beane | |
| 5,695,842 A | 12/1997 | Peck, Jr. | |
| 5,713,589 A | 2/1998 | Delgado et al. | |
| 5,791,726 A | * 8/1998 | Kaufman | ..................... 296/181 |
| 6,029,989 A | 2/2000 | Stuart et al. | |
| 6,061,979 A | 5/2000 | Johannes | |
| 6,076,844 A | 6/2000 | Stuart et al. | |
| 6,099,007 A | 8/2000 | Stuart et al. | |
| 6,112,479 A | 9/2000 | Andres | |
| 6,128,881 A | 10/2000 | Bue et al. | |
| 6,152,470 A | 11/2000 | Stuart et al. | |
| 6,173,979 B1 | 1/2001 | Bernard | |
| 6,231,266 B1 | 5/2001 | Gott | |
| 6,339,908 B1 | 1/2002 | Chuang | |

* cited by examiner

Primary Examiner—D. Glenn Dayoan
Assistant Examiner—Lori L Coletta
(74) Attorney, Agent, or Firm—Watts Hoffmann Co., L.P.A.

(57) ABSTRACT

A platform, such as a deck plate or step, for attachment to a support on an over the highway truck or tractor. The platform includes a plate having an upper surface and a lower surface. A plurality of elongated members extend from the lower surface. A plurality of hooks are defined on end portions of the elongated members. The hooks secure the platform to the support.

24 Claims, 6 Drawing Sheets

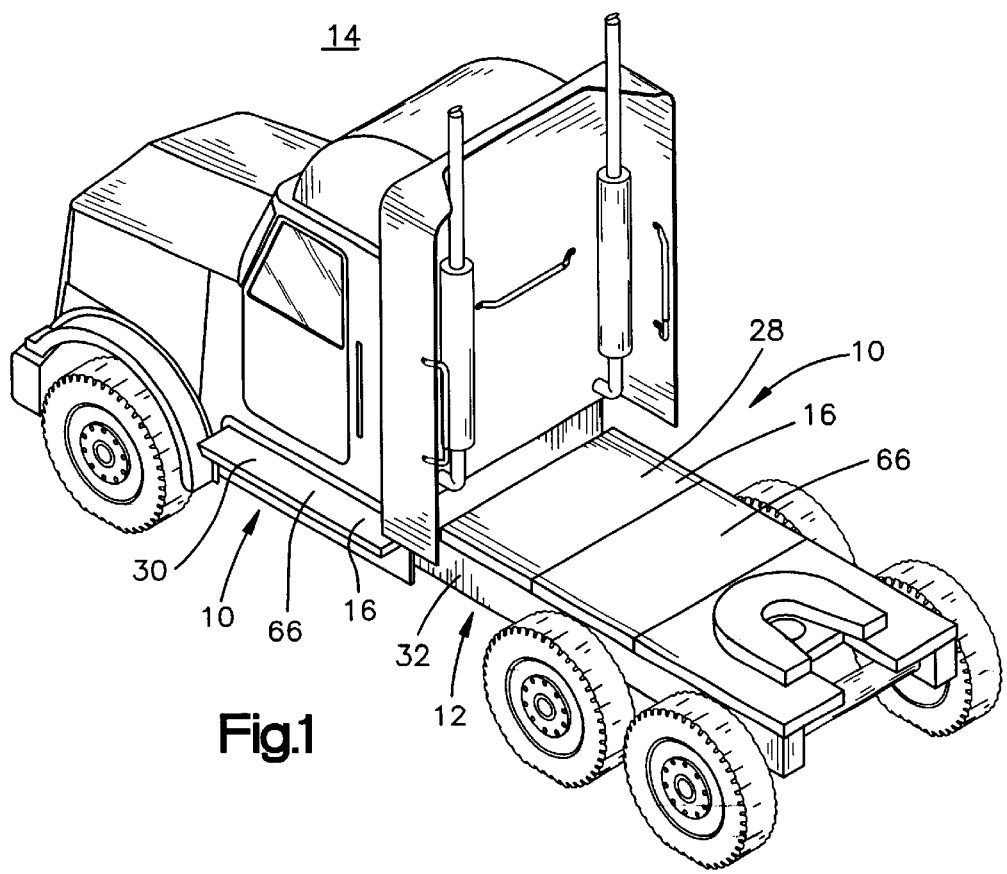
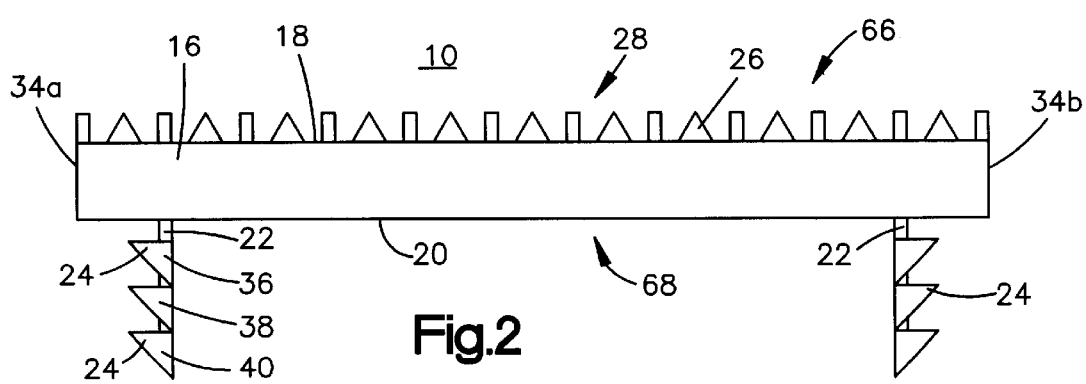
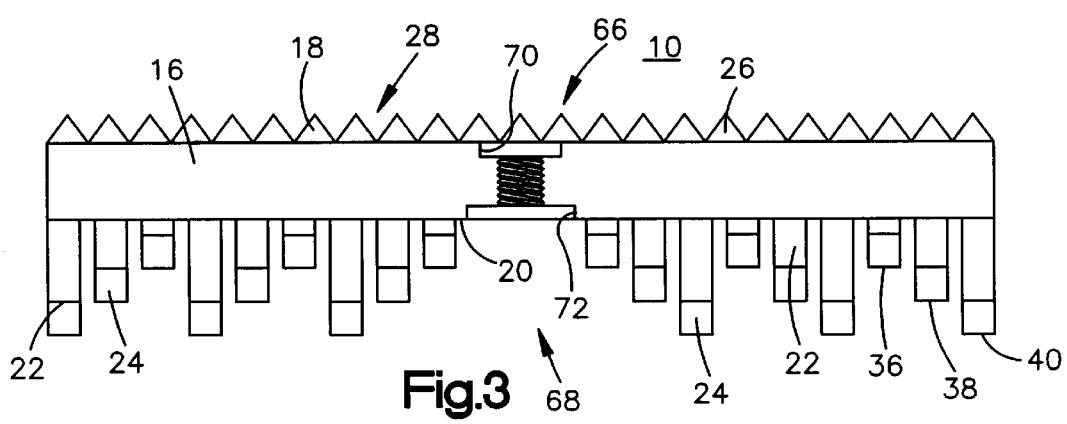

HIGHWAY VEHICLE PLATFORM

FIELD OF THE INVENTION

This disclosure relates in general to over the highway truck or tractor platforms, such as deck plates and steps. More specifically, this disclosure relates to over the highway truck or tractor deck plates and steps that require fewer fasteners than traditional deck plates and steps.

BACKGROUND OF THE INVENTION

Current over the highway truck or tractor platforms, such as deck plates and steps are mounted to a support at two to four points. In the case of a deck plate, the support is typically the frame rail of the truck or tractor. Current trucks have four to five different frame rail thicknesses. In the case of a step, the support may be a sheet metal bracket. Currently, up to five pieces of hardware are used to fasten the platform to the support at each connection point. For example, a screw, a top plate, a bottom plate, a lock washer, and a nut are typically used to fasten the platform to the support at each connection point. Considerable time is required to fasten platforms to supports using conventional hardware. As a result, the production time of a vehicle is increased.

Weight is one of the most important factors in the design of an over the highway truck or tractor. Vehicle operators are often paid by the ton/mile. Highway regulations set maximum weights for loaded trucks and tractors. As a result, the lighter the over the highway truck or tractor is, the more profitable it is. Even a small decrease in the weight of an over the highway truck or tractor greatly increases the profitability of the truck or tractor over its life.

Although it may seem negligible, the combined weight of the multiple pieces of conventional hardware required to fasten the steps and deck plates to an over the highway truck or tractor is significant. In addition, current steps and deck plates are generally made from metal plates that contribute to the weight of the vehicle.

There is a need for platforms for over the highway trucks and tractors that can be secured to supports with substantially less hardware than is required for traditional platforms, are easy to install in a short period of time and are lightweight.

SUMMARY

This disclosure is directed to a platform for attachment to a support on an over the highway truck or tractor. The platform includes a plate having an upper surface and a lower surface. A plurality of elongated members extend from the lower surface. A plurality of latching hooks are defined on end portions of the elongated members. The latching hooks facilitate attachment of the platform to supports on the over the highway truck.

In one embodiment, the plurality of elongated members includes members having different lengths. The different lengths of the elongated members accommodates attachment of the platform to supports having varying thicknesses.

In one embodiment, the platform includes a plurality of elongated members with latching hooks along one side of the plate. A lip extends from the lower surface along the second side of the plate. The lip defines a channel between the lower surface and the lip. In this embodiment, the platform is attached to supports by placing the channel over one support to constrain one side of the platform and pressing the latching hooks over a second support to constrain the other side of the platform.

In one embodiment, a new quick connect fastener is used to secure the platform to the support. The fastener includes an elongated portion with threads and an arcuate surface extending radially outward from the elongated portion. First and second heads are defined at the ends of the elongated portion. The first head accommodates rotation of the fastener from an upper side of the platform and the second head accommodates rotation of the fastener from the lower side of the platform to bring the arcuate surface of the fastener into engagement with a support to secure the platform. The arcuate surface may define a cam. The arcuate surface may define a portion of a circle, such that the fastener can be rotated to clear the support. In one embodiment, the first and second heads are hex heads that are rotatable with a hex tool.

Additional features of the invention will become apparent and a fuller understanding will be obtained by reading the following detailed description in connection with the accompanying drawings.

BRIEF DESCRIPTION OF THE DRAWINGS

FIG. 1 is a perspective view of a tractor including novel and improved platforms of the present invention;

FIG. 2 is a front elevational view of a deck plate;

FIG. 3 is a side elevational view of a deck plate;

DETAILED DESCRIPTION OF THE INVENTION

Figure 4:
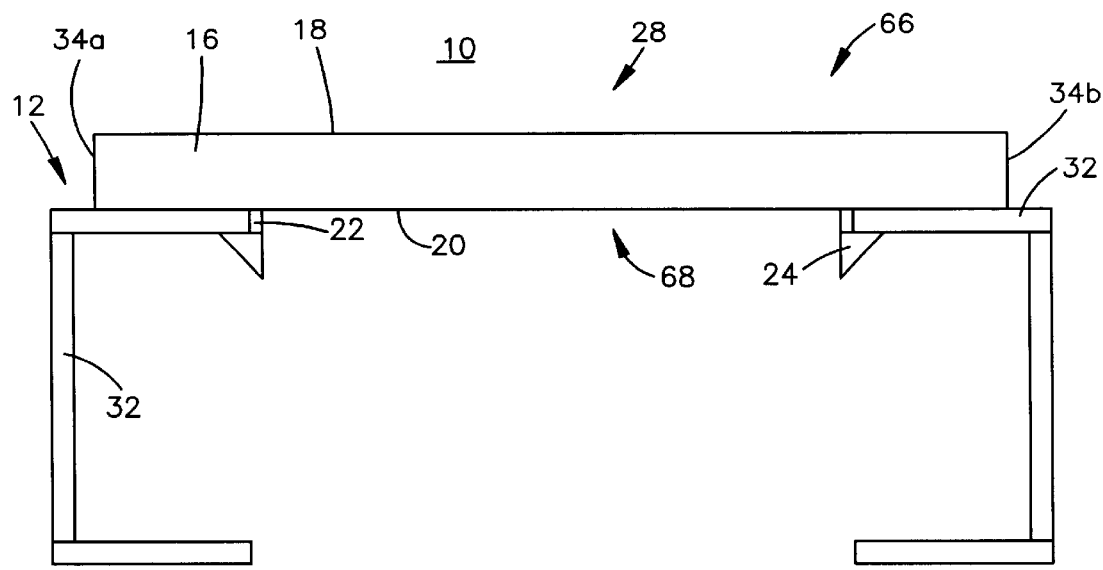
FIG. 4 is a front elevational view of a deck plate connected to a support.

The present disclosure is directed to a platform 10 for attachment to a support 12 on an over the highway truck or tractor 14. The platform 10 includes a plate 16 having an upper surface 18 and a lower surface 20. A plurality of elongated members 22 extend from the lower surface 20. A plurality of hooks 24 are defined on end portions of the elongated members. The hooks 24 secure the platform 10 to the support 12.

The plate 16 may be constructed from steel, aluminum or plastic. The illustrated plate 16 is constructed from plastic and defines a tread 26 that provides traction for the user and is self-cleaning in the exemplary embodiment. The plate 16 can be molded from plastic to form an aesthetically pleasing platform 10. For example, the plate may be molded in a honeycomb pattern with cross-cut serrations, cross-hatched open grids with serrated edges, raised hollow circles or a diamond shaped open grid with raised cut serrations. Although many plastic materials have strength properties similar to aluminum, a thin vertically oriented aluminum section could be integrally molded in the plate 16 to provide additional resistance to sagging.

In one embodiment, a dot code is molded into the top side of the deck plate that provides notice to the installer of a torque required to fasten the plate 16 to a given frame rail thickness. A plastic plate eliminates corrosion that occurs with steel deck plates and galvanic corrosion that occurs when aluminum deck plates are bolted to a steel support 12. In one embodiment, a holder for a pogo stick is molded into the plate 16. (A pogo stick is a device for supporting air lines used to connect the tractor to the trailer).

One type of platform 10 is a deck plate 28. A second type of platform 10 is a step 30. In the exemplary embodiment, the supports 12 for deck plates 28 are frame rails 32. Frame rails 32 typically have a variety of different thicknesses. For example, current trucks have four or five different frame rail thicknesses. Referring to FIGS. 2 and 3, the elongated members 22 of the deck plate 28 have varying lengths to accommodate frame rails 32 (FIG. 4) having varying thicknesses. In the illustrated embodiment, a first set of elongated members 22 with hooks 24 extend from the lower surface 20 near a first side 34a of the plate 16 and a second set of elongated members 22 that include hooks 24 extend from the lower surface 20 near the second side 34b of the plate 16. In the illustrated embodiment, each set of elongated members 22 with hooks 24 includes a plurality of short members 36, a plurality of intermediate members 38 and a plurality of relatively long members 40. The short members 36, intermediate members 38 and relatively long members 40 accommodate frame rails 32 or other types of supports 12 having varying thicknesses.

Referring to FIG. 4, in use, the deck plate 28 is snapped onto frame rails 32. The flexible hooks 24 guide the deck plate 28 into position, bend inward when forced down and then snap back into place to secure the deck plate 28 to the frame rails 32. The hooks 24 that snap back into place depend on the thickness of the frame rail 32 or support. For example, when a relatively thick support is used, only the hooks 24 on the relatively long members 40 will snap back into place. The hooks 24 on the short members 36 and intermediate members 38 will remain bent inwardly. When a thinner frame rail 32 or other support is used, the hooks 24 on the long members 40 and intermediate members 38 may snap back to place. The short members will remain bent inward. When a thin deck plate 28 or support is used, the short members 36, intermediate members 38 and relatively long members 40 will all snap back into place.

Figure 11:
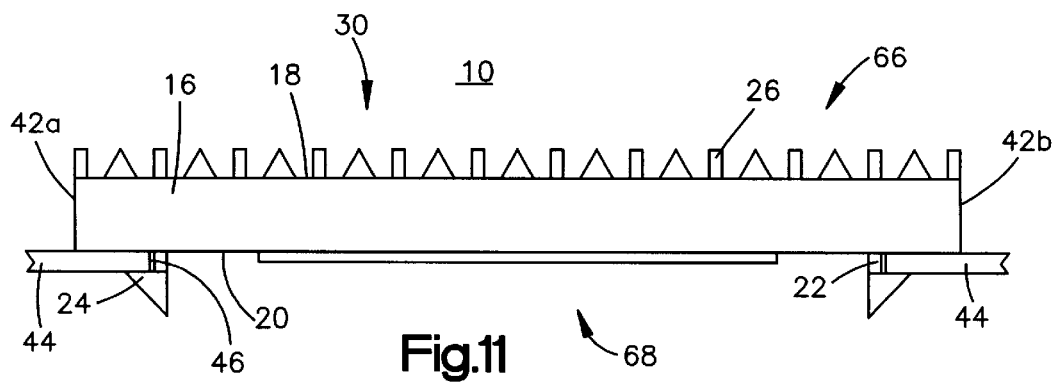
FIG. 11 is a front elevational view of a step.
Figure 12:
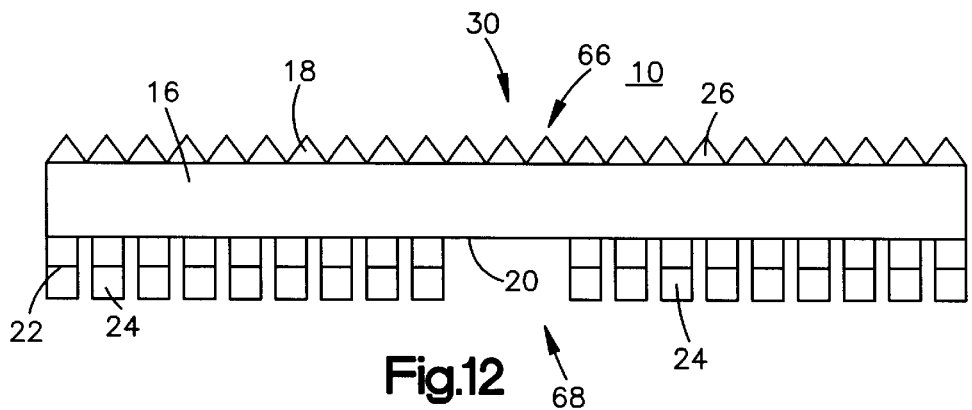
FIG. 12 is a side elevational view of a step.

FIGS. 11 and 12 illustrate a step 30 of one embodiment. In this embodiment, a set of elongated members 22 that includes hooks 24 extend from the lower surface 20 near first and second sides 42a, 42b of the plate 16. In the illustrated embodiment, the elongated members 22 have substantially the same length. In the exemplary embodiment, the step 30 is mounted in a support structure 44 that includes a rectangular opening 46. The rectangular opening 46 facilitates the self-cleaning action of the step 30. The material thickness for the support structure 44 for steps 30 is relatively constant. As a result, only one length of elongated member 22 with hook 24 may be necessary. In one embodiment, elongated members 22 having different lengths are used to accommodate variations in thickness of the support structure 44.

Figure 13:
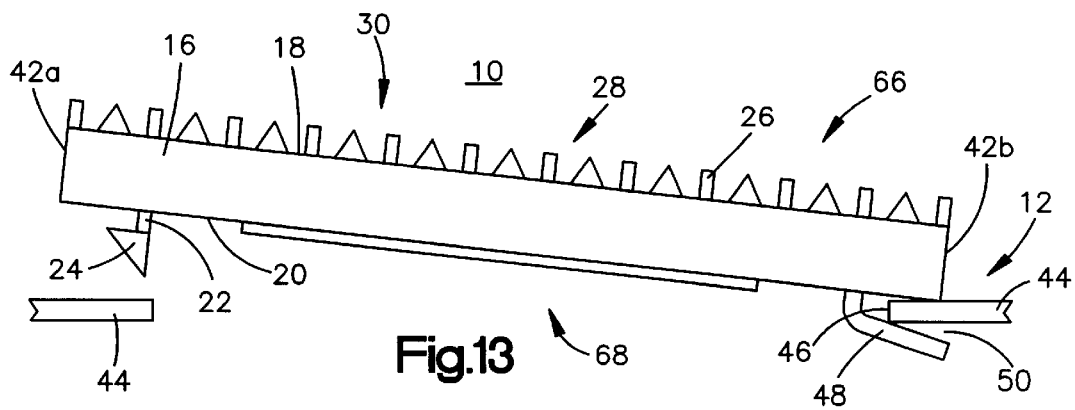
FIG. 13 is a side elevational view of a step being connected to a support.
Figure 14:
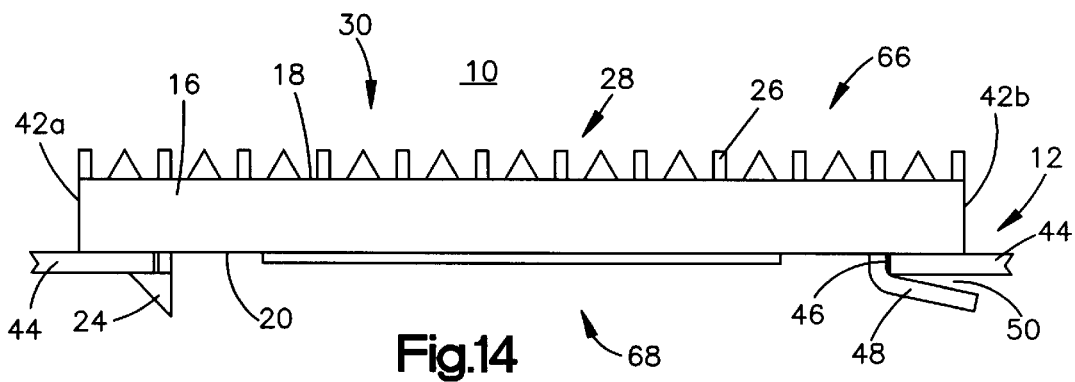
FIG. 14 is a side elevational view of a step connected to a support

FIGS. 13 and 14 illustrate a step 30 of a second embodiment. In this embodiment, a plurality of elongated members 22 that include hooks 24 extend from the lower surface 20 near the first side 42a of the plate 16. A lip 48 extends from the lower surface near a second side 42b of the plate 16. The lip 48 defines a channel 50 between the lower surface 20 and the lip 48.

To install the step 30 illustrated by FIGS. 13 and 14, the channel 50 is placed around the support structure 44. The step 30 is pressed down to deform the elongated members 22 and hooks 24. Hooks 24 snap back into place as shown in FIG. 14 to constrain the step 30 in the rectangular opening 46.

In one embodiment, a fastener 52 is used to further constrain the platform 10 to the support 12. Referring to FIGS. 5, 7, 8, 9 and 10, the fastener 52 includes an elongated portion 54 that includes threads 55. First and second end portions 56a, 56b extend from the elongated portion 54. A head 58 is included at the first end 56a and a head 60 is included at the second end 56b. Either head 58, 60 can be used to rotate the fastener 52. In the illustrated embodiment, the heads 58, 60 are hex heads. An arcuate surface 62 extends radially outward from the elongated portion 54.

Figure 7:
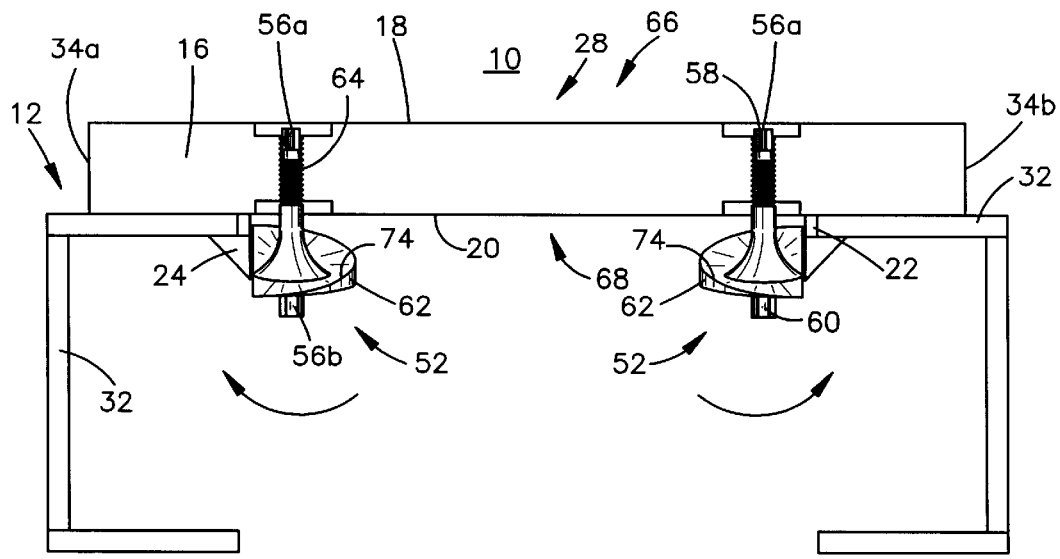
FIG. 7 is a front elevational view of a deck plate secured to a support with fasteners.
Figure 8:
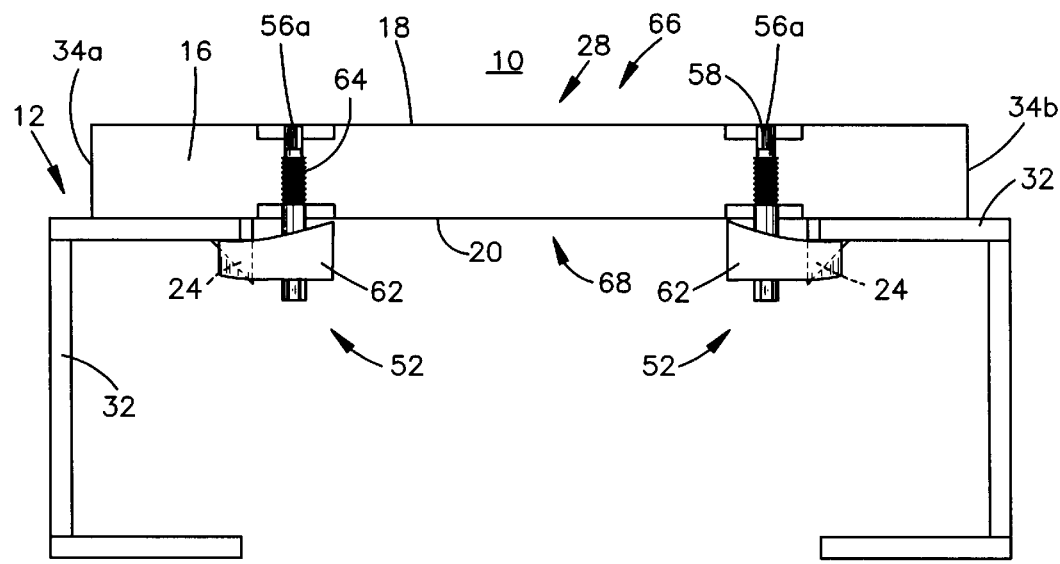
FIG. 8 is a front elevational view of a deck plate secured to a support with fasteners.

Referring to FIGS. 7 and 8, the threaded portions 54 are mounted in threaded holes 64 in the plate 16. The head 58 is rotatable by accessing the head 58 from an upper side 66 of the plate 16. The head 60 is rotatable by accessing the head 60 from a lower side 68 of the plate 16. The threaded hole 64 is located such that rotation of the fastener brings the arcuate surface 62 into engagement with the support 12 to brace the platform 10.

Referring to FIG. 3, the illustrated plate 16 includes an upper recess 70 and a lower recess 72. The upper recess 70 allows the head 58 to be accessed from the upper side 66 of the platform 10, without requiring the head 58 to be above the upper surface 18 of the plate 16.

Figure 5:
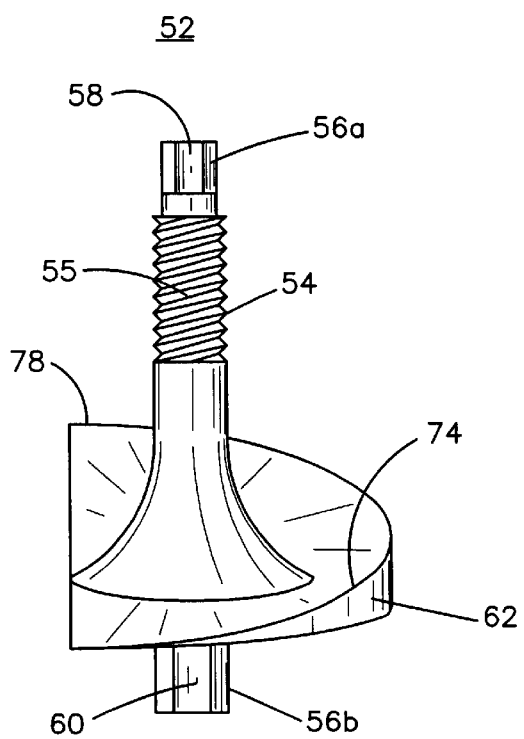
FIG. 5 is a side elevational view of a fastener for securing a platform to a support.
Figure 6:
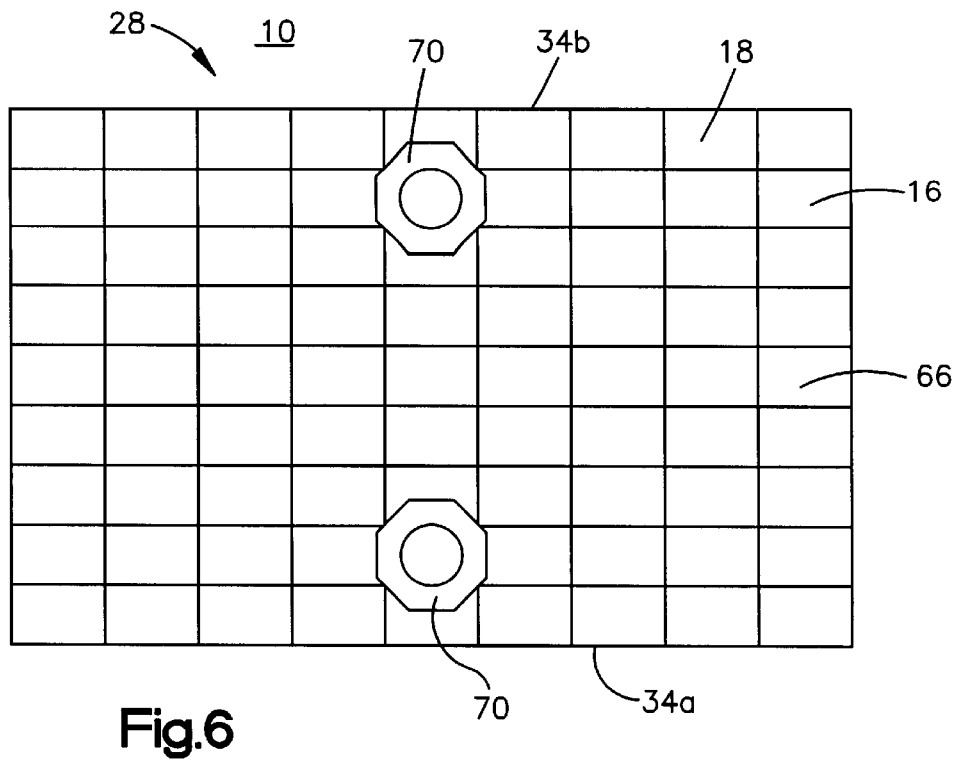
FIG. 6 is a top plan view of a deck plate.

Referring to FIGS. 5, 7 and 8, in one embodiment, the arcuate surface 62 defines a cam 74. The cam 74 applies more normal force between the support 12 and the platform 10 with little rotation of the fastener 52.

Figures 9, 10:
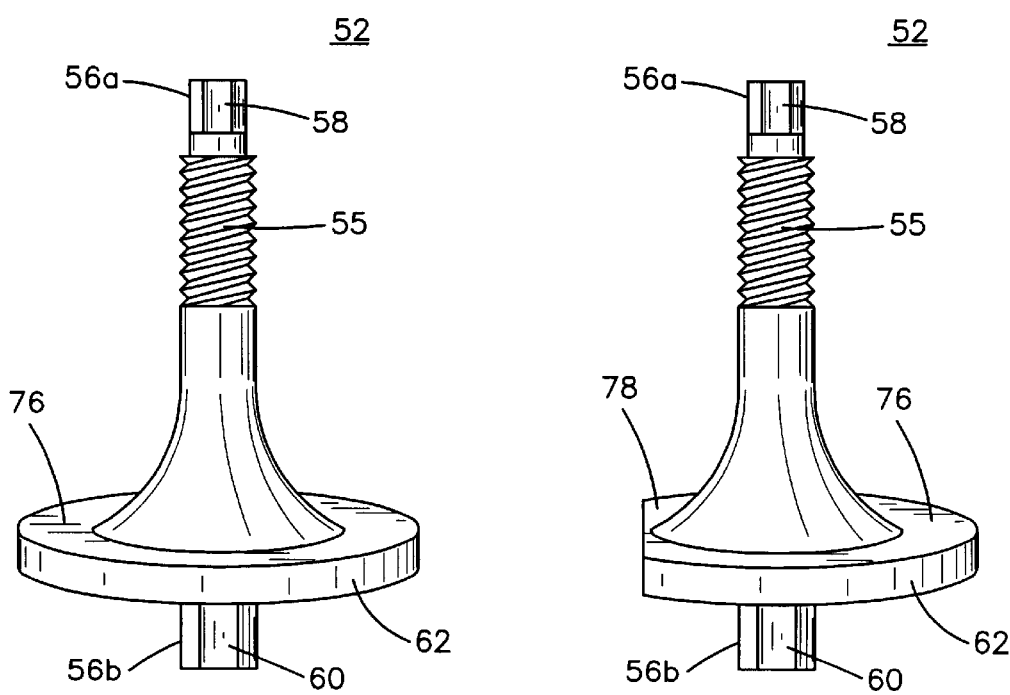
FIG. 9 is a side elevational view of a fastener for securing a platform to a support.
FIG. 10 is a side elevational view of a fastener for securing a platform to a support.

FIGS. 9 and 10 illustrate an arcuate surface 62 of another embodiment. In the embodiment illustrated by FIGS. 9 and 10, the arcuate surface defines a plane 76, similar to a standard washer.

Referring to FIGS. 5 and 10, in one embodiment the arcuate surface 62 defines a portion of a circle 78. In the illustrated embodiment, a portion of the arcuate surface is cut off. This allows the fastener 52 to be rotated to clear the support. For example, the fastener can be rotated to clear the frame rails 32 or can be rotated to clear the support structure 44.

In one embodiment, the fastener 52 is used with a locking mechanism such as a jam nut.

Figure 15:
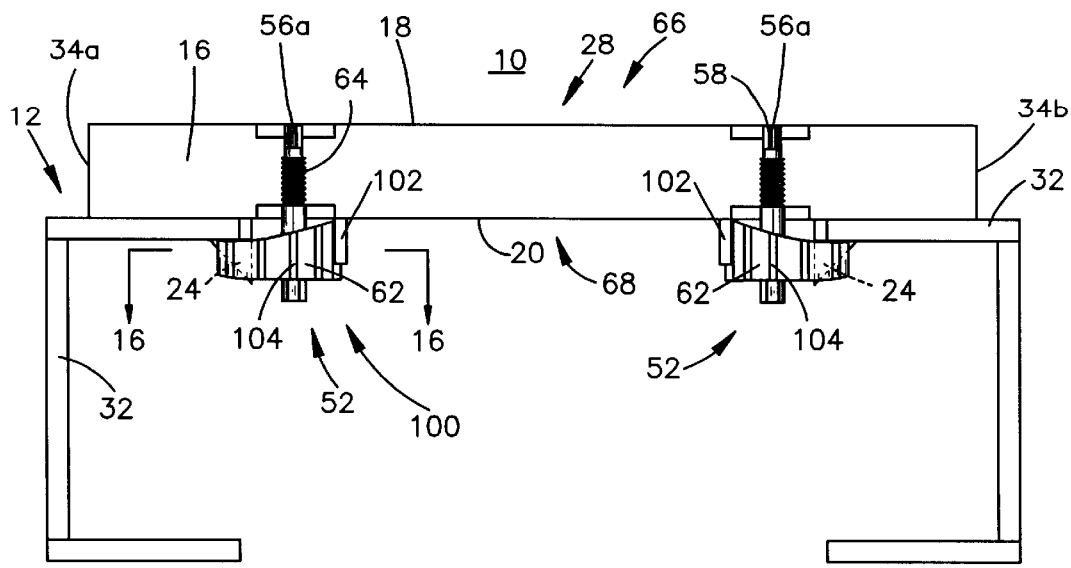
FIG. 15 is a front elevational view of a support assembly that includes a locking mechanism.
Figures 16A, 16B:
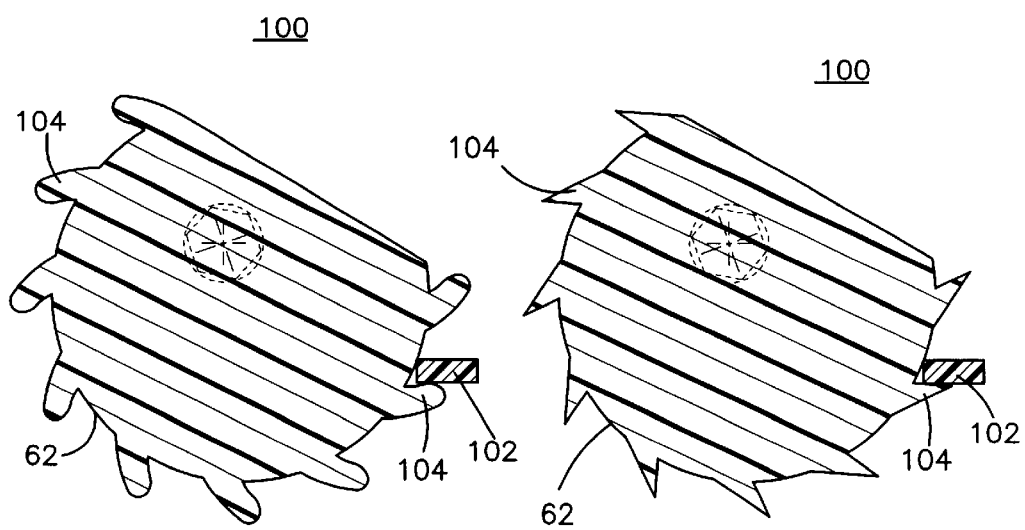
FIG. 16A is a view taken along lines 16—16 of FIG. 15 showing a locking mechanism of one embodiment.
FIG. 16B is a view similar to the view shown in FIG. 16A showing a locking mechanism of a second embodiment.

Referring to FIGS. 15, 16A and 16B, in one embodiment a locking mechanism 100 is defined by the fastener 52 and the support 12. A tab 102 or flexible finger extends down from the support 12. The fastener 52 includes projections 104 that extend from the arcuate surface 62. In the illustrated embodiment, the projections 104 have a tapered shape. The tab 102 engages the projections 104 when the fastener is rotated. The tapered shape of the projections allows rotation of the fastener in one direction (typically tightening) and prevents rotation of the fastener in an opposite direction (typically loosening). The projections illustrated by FIG. 16A are "teardrop" shaped. The projections illustrated by FIG. 16B are triangular in shape. It should be readily apparent to those skilled in the art that any shape that is tapered could be used. In the exemplary embodiment, the fastener can be turned in the opposite direction by holding the tab 102 outward of the fastener to remove or loosen the fastener.

The fastener 52 replaces several pieces of traditional hardware. In addition, attachment of the platform 10 to the support 12 is much easier, since the fastener can be rotated from either the upper side 66 or the lower side 68 of the plate 16. For example, the elongated threaded portion 54 may be threaded into the threaded hole 64 form the lower side of the platform 10. The fastener may be rotated so that it does not interfere with the support 12 when the platform 10 is snapped into the support. Once the platform is attached to the support, the head 58 is rotated from the upper side 66 of the platform 10 to bring the arcuate surface 62 into engagement with the support to brace to the platform 10.

Although the present invention has been described with a degree of particularity, it is the intent that the invention include all modifications and alterations falling within the spirit or scope of the appended claims.

I claim:

1. In a platform attached to supports of an over the highway truck or tractor that includes a plate including an upper surface and a lower surface, wherein the improvement comprises:
   a) a first plurality of elongated members having a first length extending from said lower surface;
   b) a first plurality of latching hooks defined on end portions of said first elongated members;
   c) a second plurality of elongated members having a second length extending from said lower surface;
   d) a second plurality of latching hooks defined on end portions of said second elongated members, said first and second lengths accommodating attachment of said plate to supports having varying thicknesses.

2. The platform of claim 1 further comprising a fastener including an elongated portion that includes threads and a cam surface extending radially outward from said elongated portion, said elongated portion mounted in a threaded hole in said plate, said threaded hole being located such that rotation of said fastener brings said cam surface into engagement with a support to brace said platform.

3. The platform of claim 2 further comprising tapered projections extending from said cam surface and a tab that extends from said lower surface and engages said tapered projections when said fastener is rotated to allow rotation of said fastener in a first direction and inhibit rotation of said fastener in a second direction.

4. The platform of claim 1 further comprising a fastener including an elongated portion having first and second ends that each include a head for rotating said fastener and an arcuate surface extending radially outward from said elongated portion, said elongated portion including threads mounted in a threaded hole in said plate, said threaded hole being located such that rotation of said fastener brings said arcuate surface into engagement with a support to brace said platform.

5. The platform of claim 4 wherein said heads on said first and second ends of said elongated portion are hex heads.

6. The platform of claim 1 further comprising a fastener including an elongated portion having first and second ends that each include a head for rotating said fastener and an arcuate surface extending radially outward from said threaded portion, said elongated portion including threads mounted in a threaded hole in said plate such that said first head is rotatable by accessing said first head from an upper side of said plate and said second head is rotatable by accessing said head from a lower side of said plate, said threaded hole being located such that rotation of said fastener brings said arcuate surface into engagement with a support to brace said platform.

7. A platform for attachment to supports of varying thicknesses on an over the highway truck or tractor, comprising:
   a) a plate including an upper surface and a lower surface;
   b) a first plurality of elongated members having a first length extending from said lower surface;
   c) a first plurality of latching hooks defined on end portions of said first elongated members:
   d) a second plurality of elongated members having a second length extending from said lower surface;
   e) a second plurality of latching hooks defined on end portions of said second elongated members;
   f) a third plurality of elongated members having a third length extending from said lower surface; and
   g) a third plurality of latching hooks defined on end portions of said third elongated members, said first, second, and third lengths accommodating attachment of said plate to supports having varying thicknesses.

8. The platform of claim 7 further comprising a fastener including an elongated portion and a cam surface extending radially outward from said threaded portion, said elongated portion including threads mounted in a threaded hole in said plate, said threaded hole being located such that rotation of said fastener brings said cam surface into engagement with a support to brace said platform.

9. The platform of claim 8 further comprising tapered projections extending from said cam surface and a tab that extends from said lower surface and engages said tapered projections when said fastener is rotated to allow rotation of said fastener in a first direction and inhibit rotation of said fastener in a second direction.

10. The platform of claim 7 further comprising a fastener including an elongated portion having first and second ends that each include a head for rotating said fastener and an arcuate surface extending radially outward from said threaded portion, said elongated portion including threads mounted in a threaded hole in said plate, said threaded hole being located such that rotation of said fastener brings said arcuate surface into engagement with a support to brace said platform.

11. The platform of claim 10 wherein said heads on said first and second ends of said elongated portion are hex heads.

12. The platform of claim 7 further comprising a fastener including an elongated portion having first and second ends that each include a head for rotating said fastener and an arcuate surface extending radially outward from said threaded portion, said elongated portion including threads mounted in a threaded hole through said plate such that said first head is rotatable by accessing said first head from an upper side of said plate and said second head is rotatable by accessing said head from a lower side of said plate, said threaded hole being located such that rotation of said fastener brings said arcuate surface into engagement with a support to brace said platform.

13. The platform of claim 7 wherein said plate is constructed from molded plastic with a thin vertically oriented metal section integrally molded in the plate to provide resistance to sagging.

14. In a platform attached to supports of an over the highway truck or tractor that includes a plate including an upper surface and a lower surface, wherein the improvement comprises a fastener including an elongated threaded portion having first and second ends that each include a head for rotating said fastener and an arcuate surface fixed to and extending radially outward from said elongated threaded portion, said elongated portion including threads mounted in a threaded hole through said plate such that said first head is rotatable by accessing said first head from an upper side of said plate and said second head is rotatable by accessing said head from a lower side of said plate, said threaded hole being located such that rotation of said fastener rotates said arcuate surface and brings said arcuate surface into engagement with a support to brace said platform.

15. The platform of claim 14 wherein said arcuate surface defines a cam.

16. The platform of claim 14 wherein said heads on said first and second ends of said elongated portion are hex heads.

17. The platform of claim 14 wherein said arcuate surface defines a portion of a circle such that said arcuate surface can be rotated to clear said support during assembly.

18. The platform of claim 14 further comprising tapered projections extending from said cam surface and a tab that extends from said lower surface of said plate and engages said tapered projections when said fastener is rotated to allow rotation of said fastener in a first direction and inhibit rotation of said fastener in a second direction.

19. A fastener for securing a platform to supports of an over the highway truck or tractor, the platform includes a plate including an upper surface and a lower surface, said fastener comprises:
   a) an elongated portion having first and second ends, said elongated portion including threads;
   b) a first head defined at said first end for rotating said fastener;
   c) a second head defined at said second end for rotating said fastener;
   d) an arcuate surface fixed to and extending radially outward from said elongated portion, said first head accommodates rotation of said fastener from an upper side of said plate and said second head accommodates rotation of said fastener from a lower side of said plate to bring said arcuate surface into engagement with a support.

20. The fastener of claim 19 wherein said arcuate surface defines a cam.

21. The fastener of claim 19 wherein said heads on said first and second ends of said elongated portion are hex heads.

22. The fastener of claim 19 wherein said arcuate surface defines a portion of a circle such that said fastener can be rotated to clear said support.

23. The fastener of claim 19 further comprising tapered projections extending radially from said arcuate surface.

24. A platform for attachment to supports of varying thicknesses on an over the highway truck or tractor, comprising:
   a) a plate including an upper surface and a lower surface;
   b) a first plurality of elongated members having a first length extending from said lower surface;
   c) a first plurality of latching hooks defined on end portions of said first elongated members:
   d) a second plurality of elongated members having a second length extending from said lower surface;
   e) a second plurality of latching hooks defined on end portions of said second elongated members;
   f) a third plurality of elongated latching members having a third length extending from said lower surface;
   g) a third plurality of latching hooks defined on end portions of said third elongated members, said first, second, and third lengths accommodating attachment of said plate to supports having varying thicknesses;
   h) a threaded hole defined in said plate extending through said upper and said lower surface of said plate; and
   i) a fastener including an elongated portion having threads disposed in said threaded hole, said elongated portion having first and second ends that each include a head for rotating said fastener, an arcuate surface extends radially outward from said threaded portion, said first head is rotatable by accessing said first head from an upper side of said plate and said second head is rotatable by accessing said head from a lower side of said plate, said threaded hole being located such that rotation of said fastener brings said arcuate surface into engagement with a support to brace said platform.

* * * * *